United States Patent [19]

Bernhardt

[11] 4,124,970
[45] Nov. 14, 1978

[54] AUTOMATIC REEL HEIGHT CONTROL FOR A HARVESTER HEADER HAVING A FLEXIBLE CUTTERBAR

[75] Inventor: Richard P. Bernhardt, Leola, Pa.

[73] Assignee: Sperry Rand Corporation, New Holland, Pa.

[21] Appl. No.: 803,086

[22] Filed: Jun. 3, 1977

[51] Int. Cl.² ............................................. A01D 67/00
[52] U.S. Cl. .............................. 56/10.2; 56/DIG. 15
[58] Field of Search ................. 56/10.2, DIG. 15, 208, 56/10.4

[56] References Cited

U.S. PATENT DOCUMENTS

| 3,698,164 | 10/1972 | Boone et al. | 56/DIG. 15 |
|---|---|---|---|
| 3,886,718 | 6/1975 | Talbot | 56/208 |

Primary Examiner—Jay N. Eskovitz
Attorney, Agent, or Firm—Frank A. Seemar; John B. Mitchell; Ralph D'Alessandro

[57] ABSTRACT

An agricultural harvester having a header pivotally connected to the forward end of said harvester and said header having a flexible floating cutterbar on the forward lower edge thereof and a rotary reel mounted for automatically adjustable movement toward and from said cutterbar by power means to prevent accidental contact between the same. The harvester also includes power means to elevate the header to enable the same to effect desired spacing from the surface of a field when the contour is such as to require the same. Sensing means responsive to the surface of a field control the operation of the respective power means for said reel and header automatically.

14 Claims, 7 Drawing Figures

AUTOMATIC REEL HEIGHT CONTROL FOR A HARVESTER HEADER HAVING A FLEXIBLE CUTTERBAR

BACKGROUND OF THE INVENTION

It is quite common at present in harvesters such as high capacity combines to utilize so-called floating type cutterbars which have limited flexibility for purposes of permitting the same automatically to conform to the contour of the surface of a field upon which the harvesting is being undertaken. This is for purposes of insuring relatively close cutting of the crop being harvested. In such harvesters, it also is common to employ a rotatable reel having a substantially horizontal axis and including pickup fingers, the lower portion of which is adjacent the cutterbar and the reel being operable to sweep crop material against the cutterbar and into the header.

Particularly in regard to the employment of elongated, floating cutterbars which have limited flexibility, there is a problem involved in maintaining desired spaced relationship between the reel or the fingers of the reel and the floating cutterbar, primarily because the floating cutterbar flexes to conform to the contour of the ground. In some conditions it is advantageous to keep a relatively close relationship between said reel and floating cutterbar in order to sweep material from the floating cutterbar into the auger of the header.

Because of the relative movement between the floating cutterbar and the fingers of the reel, either the axis of the reel must be kept high enough to permit the fingers of the reel to clear the cutterbar in its maximum upper position resulting from the flexing thereof and under which the reel is not able to sweep the cutterbar clean, or the reel must be run at a lower elevation relative to the cutterbar, and under such circumstances, run the risk of the fingers of the reel engaging the higher portions of the flexible cutting bar.

The present harvester art has examples of the employment of hydraulic means to control the height of a reel relative to the cutterbar of the harvester. There also is known art illustrating means to control the height of the entire header relative to the ground automatically. Examples of this are illustrated in U.S. Pat. No. 3,383,845, dated May 21, 1968, to Hirsch et al. and U.S. Pat. No. 3,886,718, dated June 3, 1975, to Talbot.

It also is known in the art to employ flexible, floating cutterbars which are adapted to operate over uneven field surfaces and the limited flexibility of the bars enabling the same to cut the harvested material to a substantially uniform height above the ground. One example of a patent illustrating such cutting bar is U.S. Pat. No. 3,982,383, dated Sept. 28, 1976, in the name of Mott.

SUMMARY OF THE INVENTION

It is one of the main objects of the present invention to provide means associated with the header of a harvester to automatically control the height of the reel with respect to the highest point of a flexibile or floating cutterbar at any time during the operation thereof in order to prevent contact between the reel and the cutterbar and thereby prevent damage to either of said items.

It is a further object of the invention to accomplish such spacing automatically by the employment of sensing means mounted upon the header adjacent the cutterbar and operable to control the power means by which movement of the reel toward and from the cutterbar is achieved.

It is a further object of the invention to preferably employ fluid-operated cylinder and piston means as the power means to effect such adjustment, said cylinder and piston means being controlled in the operation thereof by valve means which preferably comprise solenoid-operated valve means actuated by a circuit connected to a source of electric power, said circuit also including switch means which are actuated by means interconnecting the same to said aforementioned sensing means.

Still another object of the invention is to provide said sensing means in the form of a plurality of fingers mounted adjacent the cutterbar and responsive to the contour of a field surface, said fingers being connected by linkage means to said aforementioned switch in a manner to operate the same selectively in one of two directions in order to either raise or lower the reel relative to the cutterbar.

It is another principal object of the invention to mount a header on the forward end of a harvester by means permitting liquid pivotal movement in order to dispose the header, and particularly the cutterbar thereon at a desired position above the field surface over which the harvester is passing and include power means operable between said header and the frame of the harvester to automatically raise and lower the header relative to the ground, such raising and lowering of the header being accomplished by control means for the power means for the header and said control means being operated by the same sensing means employed with respect to the mechanism by which the reel is raised and lowered with respect to the cutterbar.

Still another object of the invention ancillary to the foregoing invention is to provide switch means being a movable contact member commonly supporting a pair of movable contacts respectively associated with the switch in the circuit for the control means for the header and an additional switch in the control means for the power means by which the header is moved greater distances above the field surface upon which the harvester is operating, said movable switch contact member being arranged to operate override mechanism whereby the switch in the circuit for the power means of the reel first is closed and if the contour of the field surface is such as to require elevation of the header to a position spaced a greater distance from the field, said movable switch member being capable of continued movement to effect a closing of the switch in the control circuit for the power means by which the header is elevated.

One further object of the invention is to provide a cutout switch in the circuit for the control means associated with the power means for operating the reel, said cutout switch being operable when, for example, the reel is being elevated with respect to the cutterbar and, simultaneously, the header is being elevated by the power means associated therewith, the cutout switch being operable to limit the amount of movement by which the reel is elevated with respect to the cutterbar.

Other advantages and attainments provided by the present invention will become apparent to those skilled in the art upon a reading of the following detailed description when taken in conjunction with the drawings in which there is shown and described an illustrative embodiment of the invention.

DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc. are words of convenience and are not to be construed as limiting terms.

IN GENERAL

Figure 1:
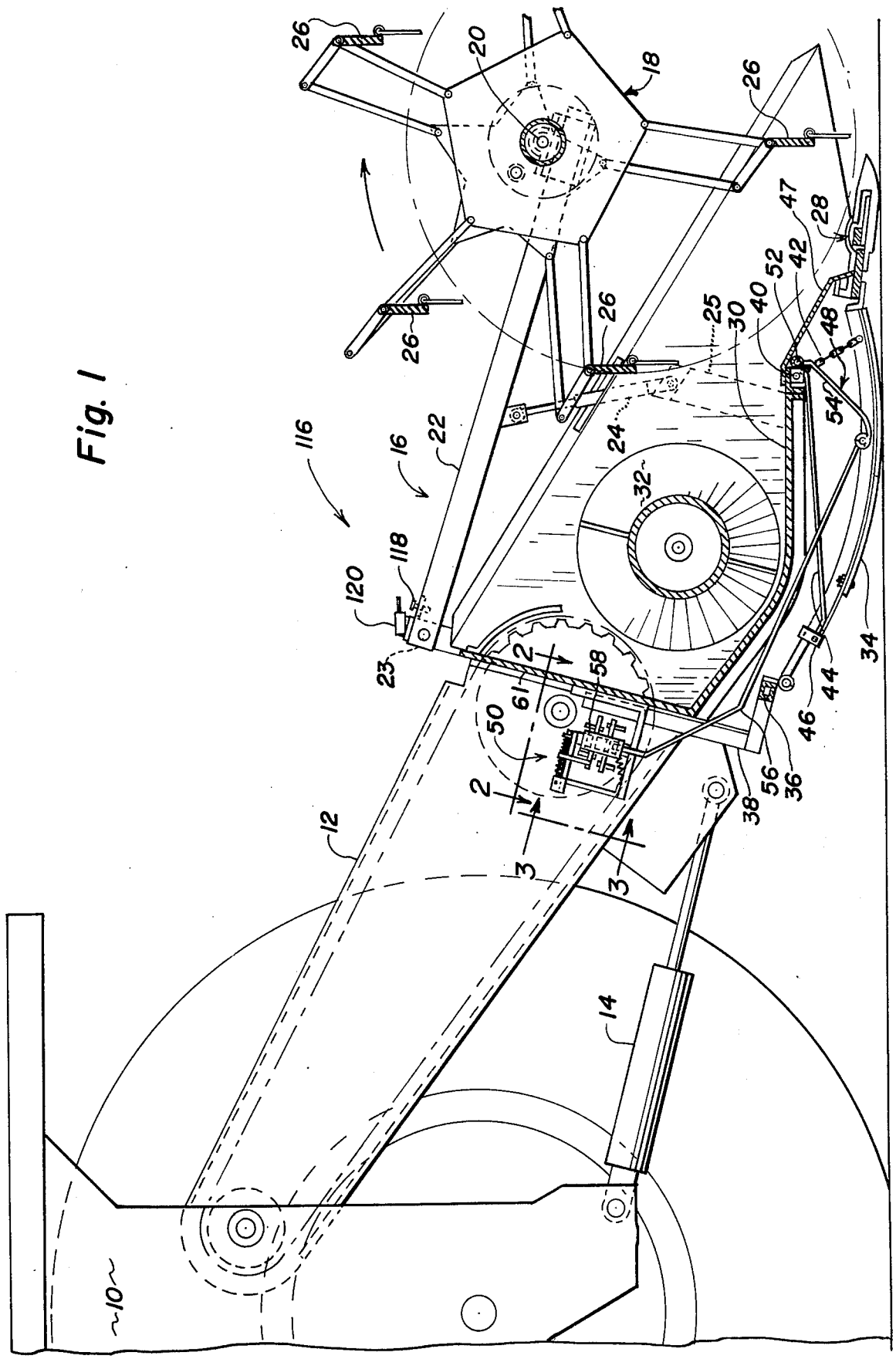
FIG. 1 is a fragmentary side elevation of an exemplary combine harvester having mounted on the forward end thereof a grain header upon which a rotary reel is mounted for automatically adjustable movement thereof toward and from the plane of the cutterbar which extends forwardly from the lower edge of the header, said view also illustrating means for raising and lowering the header relative to the ground.

Referring now to the drawings, and particularly to FIG. 1, there is illustrated therein the forward end of an exemplary combine harvester 10 which pivotally supports a feeder housing 12 and grain harvester 16 on hydraulic lift cylinders 14. The header 16 supports a conventional reel 18, rotatably mounted on axis 20 that extends between a pair of arms 22 which are pivotally connected at the rearward ends thereof on opposite sides of the header to transverse frame member 23. The arms 22 are raised and lowered in unison and the reel 18 therewith, by a pair of hydraulic cylinders 24, each one of which being mounted adjacent an opposite side of the header 16 and having its piston rod end pivotally connected to the midportion of one of the arms 22 with its cylinder end pivotally connected to an upright brace member 25. The reel 18 includes a plurality of parallel spaced bats 26 having pickup fingers mounted thereon which sweep the unserved crop material rearwardly into the cutterbar 28 and then the severed crop over the floor 30 and into the auger 32 therein the severed crop material is consolidated toward the center of the header 16 for introducing the same to the feeder housing 12 which elevates the material to the threshing and separating mechanism within the combine 10 for operation thereon.

The cutterbar 28 is conventional and includes a sickle knife which reciprocates along a transverse ledger plate and within a plurality of spaced apart forwardly projecting guards; however, for the sake of brevity, these various conventional components will not be specifically labeled but will be referred to as a complete unit per se. The cutterbar 28 is supported on the forward end of a plurality of transversely spaced apart ground shoes 34 that slide over the surface of the ground during operation of the combine 10. The shoes 34 extend in a fore-and-aft direction, below the floor 30, and are pivotally connected at their rearward end to a transverse frame member 36 that is mounted on vertical supports 38 fixedly attached to the rear wall of header 16. The forward end of each shoe 34 is connected to frame member 40, extending transversely along and adjacent to the forward edge of floor 30, by a flexible chain 42 which limits the downward vertical movement of the shoes 34 as well as the cutterbar 28. Associated with each shoe 34 is a leaf spring 44 which is pivotally connected at one end to frame member 40 and is bolted at its other end to shoe 34, the purpose of springs 44 is to counterbalance the weight of the cutterbar 28. The amount of counterbalance can be varied by slideably adjusting clamp 46. A transversely extending ramp 47, preferably of sheet metal, spans the gap between the cutterbar 28 and the front edge of floor 30. The front of ramp 47 is hinged to the cutterbar 28 and its rear edge rests on the forward edge of the floor 30. Due to the shoes 34 supporting the cutterbar 28 at intermediate portions therealong and further due to the flexible characteristics of the cutterbar 28 itself, it can be easily understood that the cutterbar 28 is free to float over the ground surface and to conform to the ground irregularities. Such floating-flexible features of the cutterbar 28, being conventional, provides for a more even severing of the crop material from the ground.

AUTOMATIC REEL HEIGHT CONTROL

In some crops and crop conditions it is most desirous that the clearance spacing between the floating-flexible cutterbar and the reel be maintained at a minimum so as to provide for a more efficient harvesting operation. In the past, it was mandatory that the reel be spaced a large distance above a floating-flexible cutterbar to thereby allow for the flexing and floating movement of the cutterbar such that the cutterbar and reel would never contact or engage one another which would result in damage and costly repairs. Thus, in accordance with the principles of the present invention, it is now possible to harvest crops with the cutterbar and reel maintained at a minimum clearance spacing.

The means for automatically controlling the clearance spacing between the reel 18 and the floating/flexible cutterbar 28 will now be discussed in reference to FIGS. 1–6; however, before going into the detailed structure thereof; it should be first pointed out that the exemplary header 16 is also provided with a automatic header height control which automatically controls the clearance spacing of the header 16 relative to the ground. Since the reel height control and the header height control share a substantial number of the same components and inter-react with one another, they will be described together. It should be further pointed out at this time that the reel height control is not dependent on the header height control and can be used on a header not having a header height control.

The means for automatically controlling the height of the reel 18 relative to the floating/flexible cutterbar 28 and the height of the header 16 relatively to the ground basically comprises sensing means, generally indicated by the numeral 48, and switch means, generally indicated by the numeral 50. The sensing means 48 includes a transverse rod 52, extending across the width of header 16, pivotally mounted forwardly of and adjacent to header frame member 40. The rod 52 supports a plurality, corresponding to the number of shoes 34, of transversely spaced-apart downwardly and rearwardly projecting sensing fingers 34. The terminal end of each finger 54 rest on the top surface of a corresponding shoe 34. As apparent, all of the sensing fingers 54 pivot in unison, either upwardly or downwardly, in conjunction with the upward and downward pivotal movement of shoes 34. In the preferred embodiment, an actuating rod 56 is pivotally connected to the terminal end of one of the right outside sensing fingers 54 and extends rearwardly therefrom and then bends upwardly for pivotal connection with the contact lever 58 of the complex switch means 50.

Figure 2:
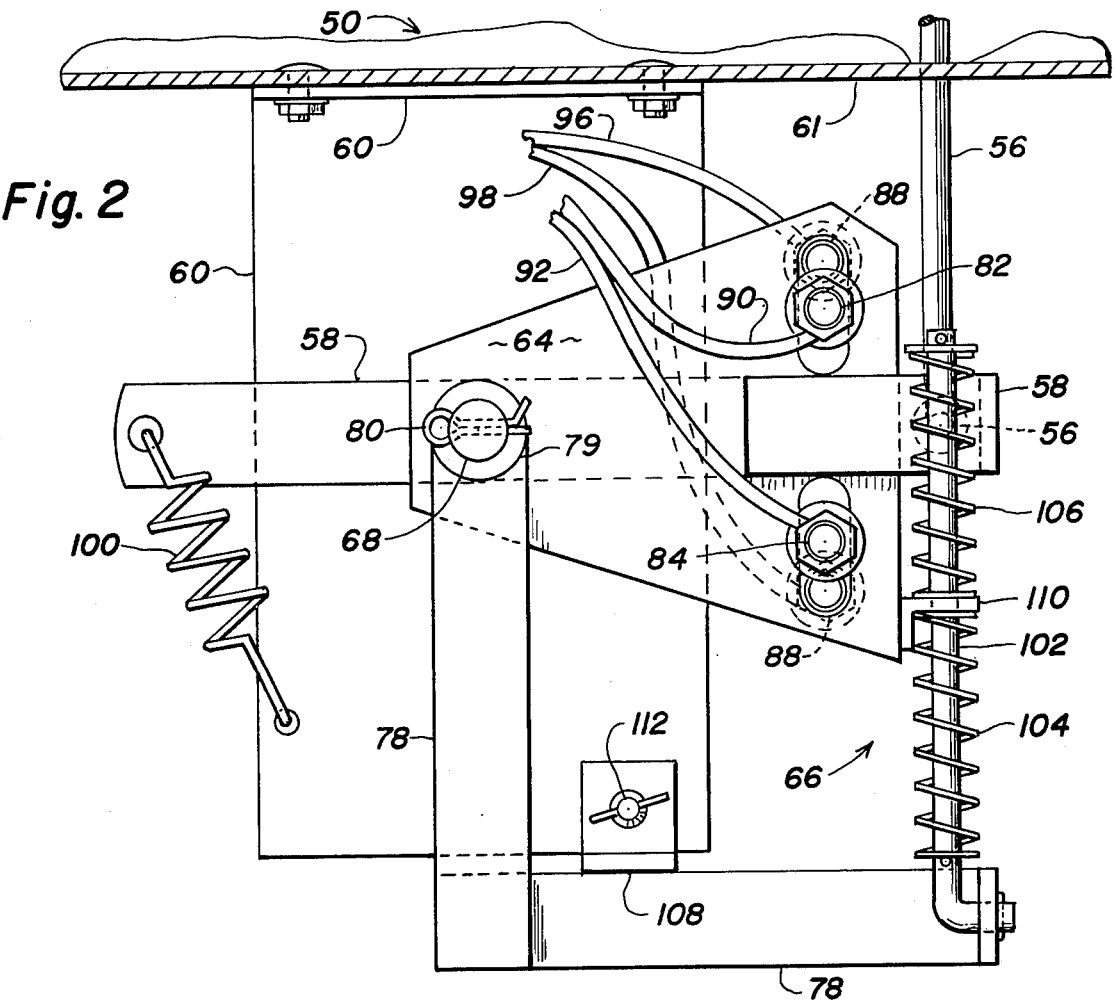
FIG. 2 is a fragmentary, enlarged view showing details of the switch means associated with the control means for effecting elevation of the reel with respect to the cutterbar and the raising of the header with respect to the field surface over which the harvester is operating, said view being a substantially horizontal plan view as seen on the line 2—2 of FIG. 1.
Figure 3:
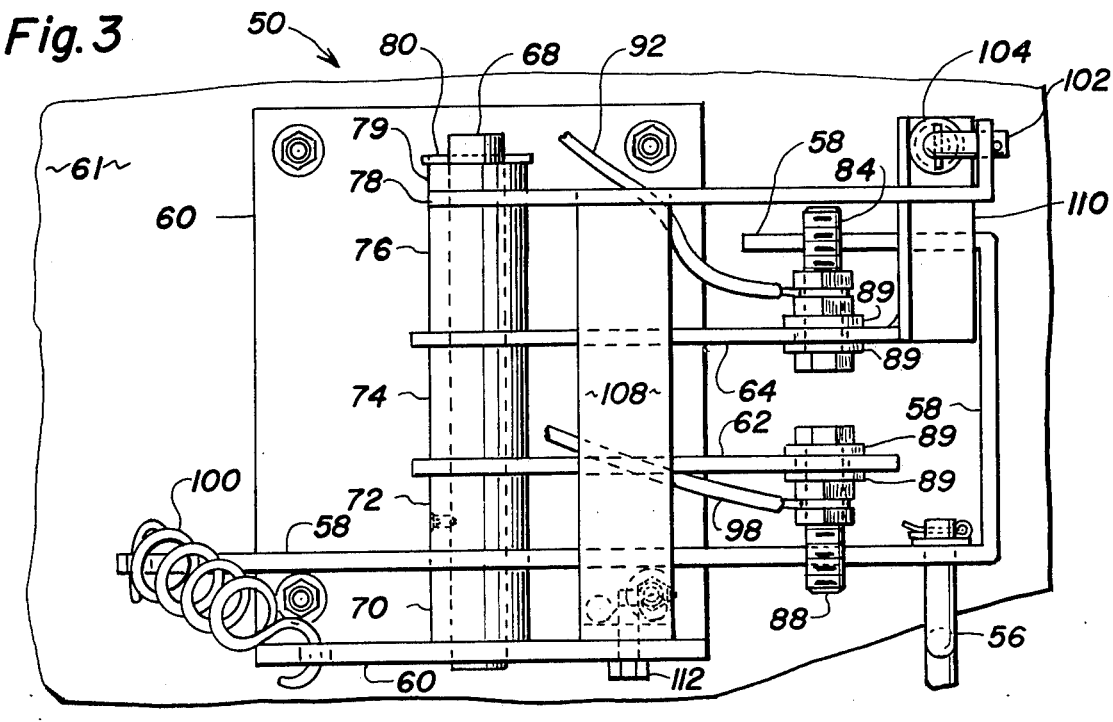
FIG. 3 is a fragmentary side elevation of the switch means shown in FIG. 2, as seen on the line 3—3 of FIG. 1.

The switch means 50, best seen in FIGS. 2-5, includes the contact lever 58, a support bracket 60, a lower switch plate 62, an upper switch plate 64 and an override mechanism associated with the upper switch plate 62 and generally indicated by the number 66. The bracket 60 is L-shaped having its vertical leg attached to the rear wall 61 of the header 16 and its other leg, projecting rearwardly therefrom, supporting a vertical shaft 68 which is fixed thereto and extends upwardly therefrom. As best seen in FIG. 3, stacked on shaft 68 is a hub 70 resting on the top surface of the horizontal leg of bracket 60, the contact lever 58, a hub 72 which is fixed to the underside of lower switch plate 62 and which is fixed to the shaft 68 by a set screw or similar such means, a hub 74, the upper switch plate 64, a hub 76, one leg of an L-bracket 78 which is part of the override mechanism 66, and a washer 79. A cotter pin 80 extending through the top of shaft 68, adjacent the washer 79, retains the various above-mentioned components on the shaft 68; the mounting being such that the bracket 78, upper switch plate 64, and contact lever 58 are free to rotate on shaft 68 whereas the lower switch plate 62 is stationarily fixed to shaft 68.

Figure 4:
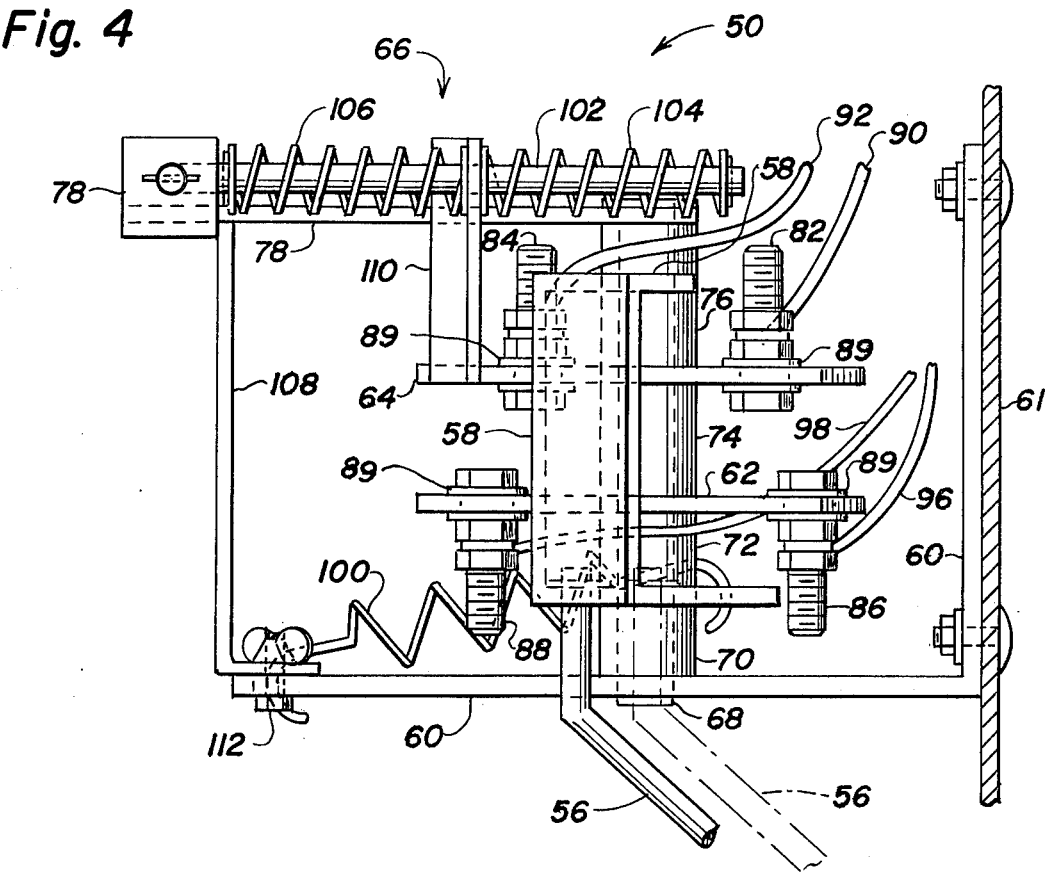
FIG. 4 is a fragmentary side elevation of the switch means as seen at right angles to the side elevation shown in FIG. 3 and illustrating the movable contact of the switch means in engagement with a contact of the upper switch shown in said figure.
Figure 5:
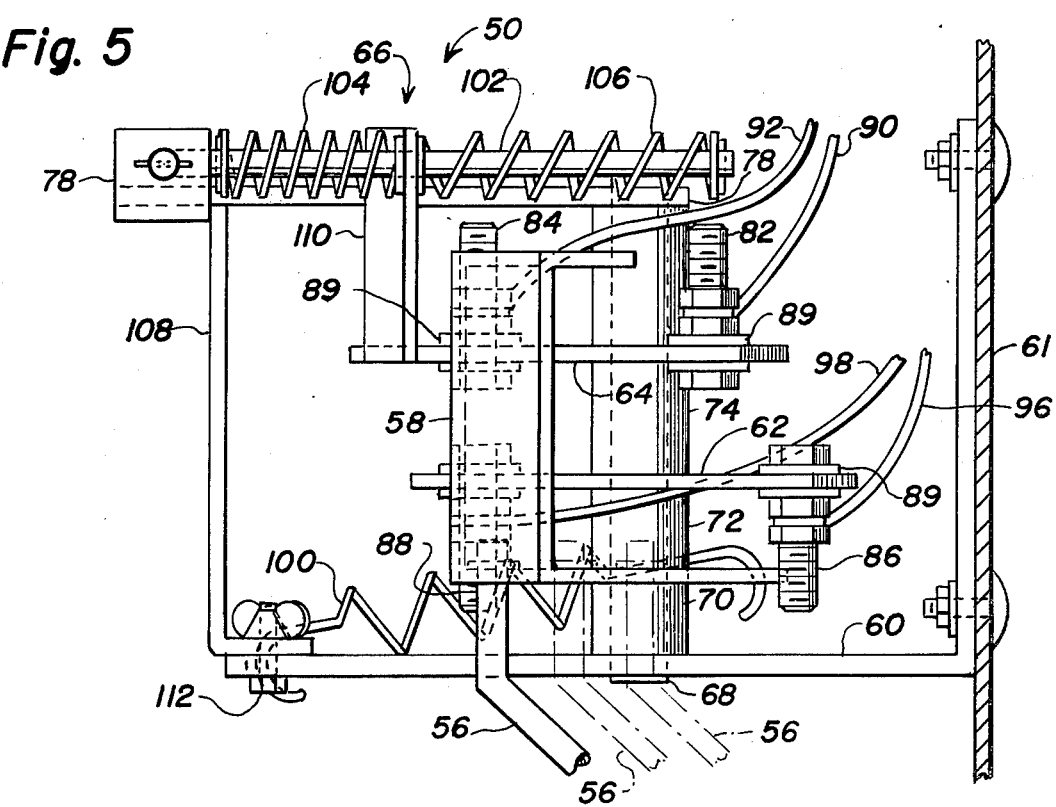
FIG. 5 is a fragmentary side elevation similar to that shown in FIG. 4 but illustrating the movable contact member in engagement with the contacts of both the upper and lower switches shown in said figure.

As seen in FIG. 2, the upper switch plate 64 which is part of the reel height control and the lower switch plate 62 which is part of the header height control are both of a trapezoidal shape (only the upper plate 64 can be seen). The upper and lower switch plates 64,62 each support a pair of spaced-apart contact pins 82,84 and 86,88 respectively, the contact pins being in the form of bolts that extend through openings in the plates and are electrically insulated from the respective plates by insulators 89. As best seen in FIGS. 4 and 5, the upper contact pins 82,84 are spaced closer together than the lower contact pins 86,88, the reason being preferably that the reel height control operates over a more limited range than the header height control. The upper contact pins 82,84 are connected by respective lead wires 90,92 to a solenoid valve 94 for actuation of the reel height lift cylinders 24 and the lower contact pins 86,88 are connected by respective lead wires 96,98 to solenoid valve 99 for actuation of the header height lift cylinders 14 (see FIG. 6 for a diagrammatic representation of the electrical and hydraulic circuitry with only one reel lift cylinder 24 and one header lift cylinder 14 being shown).

The contact lever 58 is rotatably mounted on shaft 68, as mentioned earlier, and is of a U-shaped configuration having its lower horizontal leg, as seen in FIG. 3, being of greater length than its upper horizontal leg. The terminal end of the lower leg of the contact lever 58 is connected to the rear edge of support bracket 60 by a biasing spring 100 and the other end of the lower leg, adjacent its vertical portion, connects to actuating rod 56 of the sensing means 48. As seen in FIG. 2, the contact lever 58 is disposed intermediate the upper and lower contact pins 82,84 and 86,88 respectively, such disposition represents the neutral position of the lever 58. It can be easily understood that spring 100 maintains a biasing force on contact lever 58 which is transmitted through actuating rod 56 to sensing means 48 to thereby insure that the sensing fingers 54 always remain in contact with the ground shoes 34.

While, in the preferred embodiment, the lower switch plate 62 is fixed to shaft 68, the upper switch plate 64 is rotatably mounted on shaft 68 and is provided with an override mechanism 66 which allows limited pivotal movement of plate 64 under a predetermined load. The override mechanism 66 includes the L-bracket 78, as seen in FIG. 2, rod 102, biasing springs 104 and 106, brace 108 and vertical support 110. The brace 108 is fixed to one leg of the L-bracket 78 and is attached by bolt 112 to the base support bracket 60. The vertical support 110 is fixed to the upper switch plate 64 and is provided with an aperature at its upper end for receiving rod 102. One end of the L-bracket 78 is rotatably mounted on shaft 68 whereas the other end is connected to the hook end of rod 102. Spring 104 is coiled around rod 102 and is held in a state of compression between vertical support 110 and a pin that extends through the hook end of the rod 102. Spring 106 is also coiled around rod 102 and is held in a state of compression by and between a pin through the other end of rod 102 and the vertical support 110. The override mechanism 66 is common in the art and its operation is easily understood from viewing FIG. 2, wherein it can be seen that the brace 108 maintains the L-bracket 78 in a fixed position relative to base bracket 60. As the upper switch plate 64 pivots in a counterclockwise direction, the support 108 further compresses the spring 106 whereas clockwise pivotal movement of plate 64 and support 108 therewith further compresses spring 104. Thus, biasing springs 104,106 permit limited pivotal movement of upper switch plate 64 on shaft 68 under a predetermined spring load maintained by the override mechanism 66.

OPERATION OF THE REEL AND HEADER HEIGHT CONTROL

Figure 6:
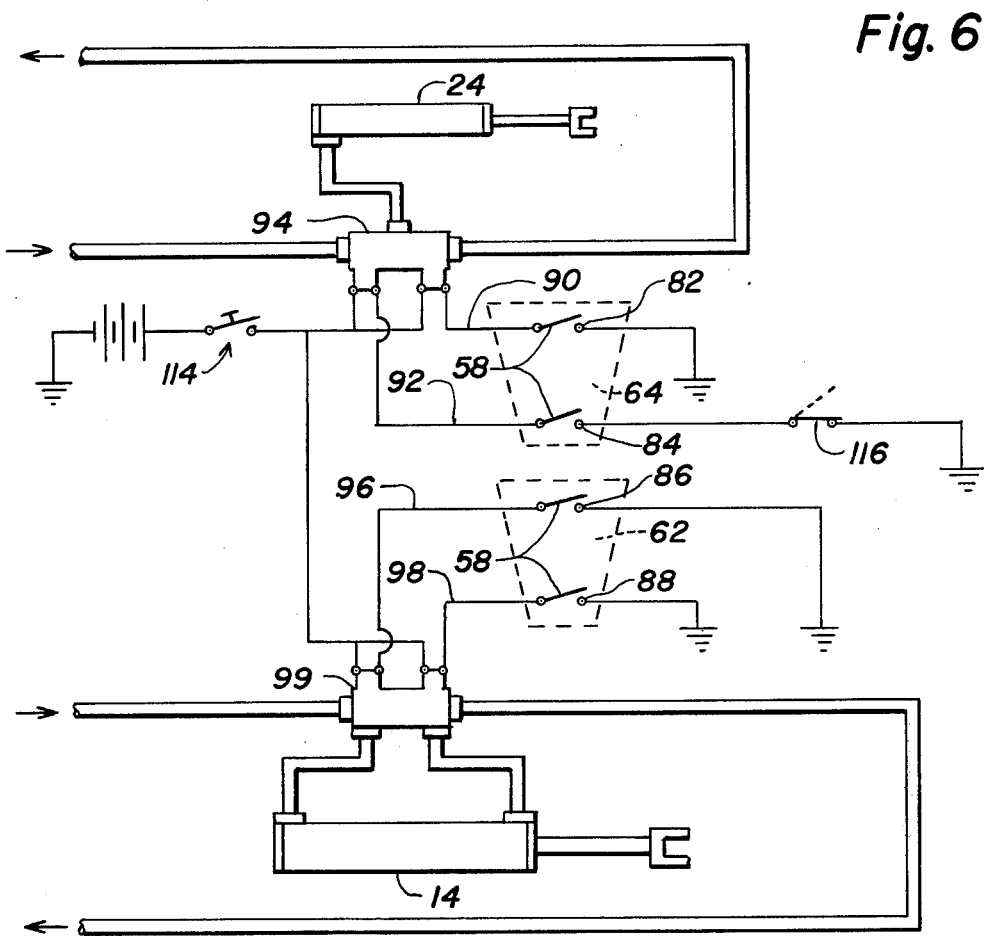
FIG. 6 is a diagrammatic illustration of a preferred electric circuit and a fluid circuit for power means respectively operable to move the reel with respect to the cutterbar and elevate the header relative to the field surface over which the harvester is operating.

The operation of the reel height control and the header height control will now be further explained in reference to FIGS. 1-6 and particularly to FIG. 6 which diagrammatically represents the hydraulic and electrical circuitry for these controls (only one of the hydraulic cylinders 14 for raising and lowering the header 16 relative to the ground and only one of the hydraulic cylinders 24 for raising and lowering the reel 18 relative to the cutterbar 28 has been shown; it being understood that a pair of the same are included). Further included in this diagrammatic circuitry is a master switch 114 interposed in the electrical power source line and generally located within the operators station of the combine 10 for turning the automatic controls on and off.

During operation of combine 10, the header 16 moves forwardly over the ground with the reel 18 being rotated in a clockwise direction, as shown by the arrow in FIG. 1, to sweep the crop material against the cutterbar 28 for severance thereof and the severed crop onto the floor 30 and into the converging auger 32 wherein the material is conveyed to the feeder house 12 for elevation into the threshing and separating components of the combine 10 for further processing thereof. As the header 16 moves over the ground, the transversely spaced pivotal mounted skid shoes 34 slide over the ground, supporting the cutterbar 28 for vertical floating and transverse flexing action wherein the cutterbar 28 follows the contours of the ground. As the surface of the ground changes in elevation, the ground shoes 34 pivot correspondingly, and thus, when any one of the shoes 34 encounters a ridge in the field, the shoe 34 pivots upwardly and when one of the shoes 34 encounters a depression or hollow it pivots downwardly.

The sensing means 48 and the switch means 50 operate in response to movement of the skid shoes 34, and since their operation is the same for both upward and downward pivotal movement of the shoes 34, but only in the reverse, then, for the sake of brevity, only the operation of the switch and sensing means will be described in relation to an upward pivotal movement of the shoes 34.

As seen in FIG. 1, upward pivotal movement (counterclockwise direction), of anyone of the shoes 34 forces its corresponding sensing finger 54 to pivot upwardly in a clockwise direction about the axis of transverse rod 52. Since all of the sensing fingers 54 pivot in unison, then upward pivotal movement of the right outside finger 54 forces the actuating rod 56 to move rearwardly thereby causing the contact lever 58 to pivot, in a clockwise direction (to the left as seen in FIGS. 3, 4 and 5), about shaft 68. Spring 100 maintains a biasing force on lever 58 which thereby insures that the sensing fingers 54 are always in an abutting relationship with the top surface of shoes 34, this is also true when the fingers 54 pivot downwardly along with the downward pivotal movement of shoes 34 when a field depression is encountered.

Rearward movement of actuating rod 54 forces the contact lever to move to the left from its neutral dotted-line position in FIG. 4 to its solid-line position, wherein the upper horizontal short leg of contact lever 58 contacts the upper switch plate pin 84. When lever 58 contacts pin 84, the circuit having lead line 92 is closed thereby energizing reel solenoid valve 94 which actuates reel lift cylinders 24 to raise the reel 18 for thereby maintaining a predetermined clearance spacing between the reel 18 and the floating/flexible cutterbar 28. It is readily apparent from the above-described reel-height control that a predetermined clearance spacing between the hightest point on the cutterbar 28 (due to its floating and flexing action) and the lower most part of the reel 18 (bat 26) will be maintained, thereby insuring that the same will not engage one another which could result in damage thereto and costly repairs.

Further rearward movement of actuating rod 54, due to further upward pivotal movement of sensing fingers 54, forces the contact lever 58 to move still further to the left (as seen in FIG. 5 from its second dotted line position to its solid-line position) in thereby contacting the lower switch plate contact pin 88. Since the upper contact pins 82,84 are spaced closer together than the lower contact pins 86,88 the described further leftward movement of contact lever 58 forces the upper switch plate 64 to pivot on shaft 68 under the restraint of the overside mechanism 66. Thus, it is seen, that the contact lever 58, in such further leftward position, now contacts both the upper contact pin 84, closing the circuit having lead line 92, and the lower contact pin 88, closing the circuit having lead line 98. Under such circumstances, both of the solenoid valves 94,99 are energized thereby respectively actuating the cylinders 24 to raise the reel 18 and actuating the cylinders 14 to raise the header 16.

Generally, most automatic header height controls are provided with means for overriding or by-passing (not shown in the exemplary embodiment) the automatic controls which enables an operator to instantly raise the header in cases where there is a large obstruction in the field. Such overrides are common and are necessitated by the fact that the hydraulics associated with the automatic controls do not react quick enough to prevent possible damage to the combine. In such situations, the header is generally raised a considerable distance higher than in the case of the automatic controls. Thus, to prevent the reel 18 from raising continuously and simultaneously with the raising of the header 16, the reel height control of the present invention is further provided with a cutout switch 116 which limits the distance the reel 18 is raised. As seen in FIG. 1, the cutout switch 116 includes a contact 118, attached to the right reel arm 22, which engages switch 120 as arm 22 pivots upwardly a predetermined distance. As discussed in the preceding paragraph, there are situations wherein the reel 18 and the header 16 are raised simultaneously; however, when the contact 118 engages switch 120 the reel height control circuit (lead line 92) is opened. The reel cylinders 24 are now idle while the header height control still is in operation causing the header 16 to continue to raise. It is felt that the operation of the cutout switch 116 is easily understood from the drawings and therefore no fully explanation will be given.

From the foregoing, a person skilled in the art can fully appreciate the various advantages set forth by the present invention in providing means for automatically maintaining a predetermined clearance spacing between the floating-flexible cutterbar and the reel to thereby prevent engagement of one with the other and to enable the reel to be operated at a closer spacing above the cutterbar in thereby promoting a more efficient harvesting operation. Further, that even though the automatic reel height control can be used separately on a header, the combination in use with a header height control results in less complexity and overall expense due to the sharing of a substantial number of like components.

ALTERNATIVE EMBODIMENT

Figure 7:
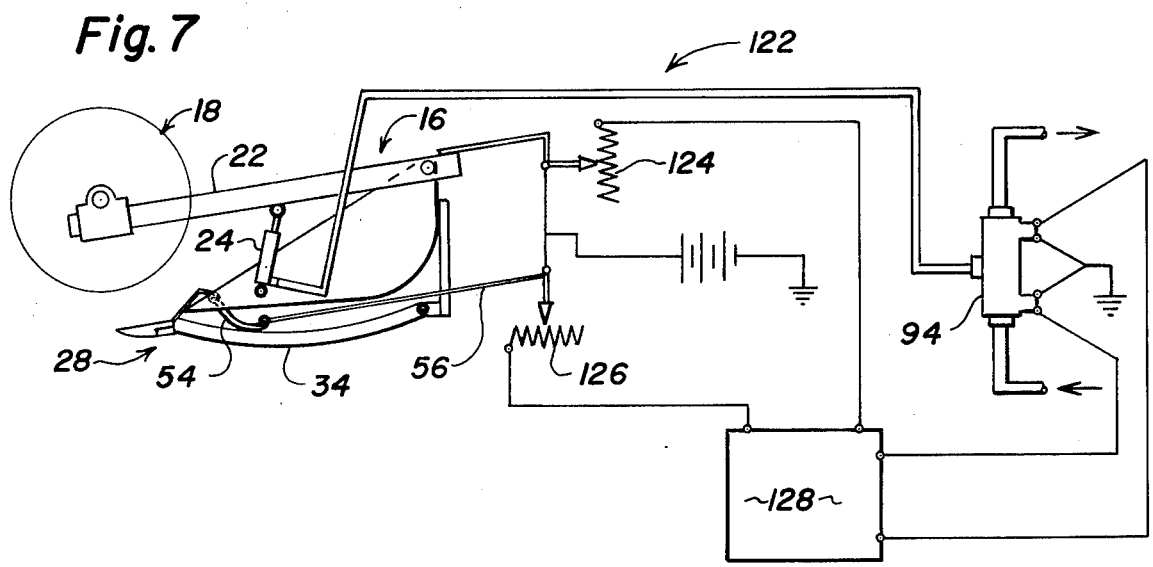
FIG. 7 is a modified electric and power circuit associated primarily with the reel of a harvester for purposes of raising and lowering the same with respect to a cutterbar.

Shown in FIG. 7, is an alternative embodiment of a switch means 122 for controlling the height of the reel 18 relative to the cutterbar 28. Specifically, the switch means 122 is substituted for the switch means 50 shown in FIG. 6. Basically, the switch means 122 includes a pair of potentionmeters 124 and 126 connected in parallel with a voltage comparator 128. The potentionmeters 124,126 being conventional, are connected to the actuating rod 56. As the rod 56 moves back and forth in response to movement of the sensing fingers 54, the resistance of the potentionmeters 124,126 vary. The comparator 128 compares the signals from the respective potentiometers 124,126 and functions to equalize the signals by energizing the solenoid valve 94 in thus actuating the reel lift cylinders 24 to thereby maintain the reel 18 at a predetermined clearance spacing from the cutterbar 28.

It is thought that the invention and many of its attendant advantages will be understood that the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

Having thus described the invention, what is claimed is:

1. An agricultural harvester having a forward end, a header supported on said forward end and including a reel rotatable about a horizontal axis on said header and a flexible cutterbar supported on said header normally below the level of the path of movement of said reel, and power means operable to move the axis of said reel vertically relative to said cutterbar, in combination with control means operable automatically to energize said power means to space said reel above the highest portion of said flexible cutterbar during harvesting operation thereof to prevent contact between said reel and cutterbar.

2. The harvester according to claim 1 in which said header includes platform means slidably conformable with said flexible cutterbar to a field surface and in which said control means includes sensing means operable in response to flexing movements of said platform means and cutterbar to actuate said power means.

3. The harvester according to claim 2 in which said power means comprises fluid-operated cylinder and piston means, and said header further including movable support means for the axis of said reel, said power means engaging said movable support means to actuate it as aforesaid.

4. The harvester according to claim 1 in whih said header further includes means to support said reel for said vertical movement relative to said cutterbar and said power means being connected to said support means to actuate the same, said control means comprising sensing means responsive to the contour of a field surface, and means connecting said sensing means to said control means and operable thereby to actuate said power means and move said reel support as aforesaid.

5. The harvester according to claim 4 in which said power means comprises fluid-operated cylinder and piston means connected to said reel support, and said control means comprising valve means for said cylinder and piston means, and means interconnecting said valve means and sensing means to actuate said valve means thereby.

6. The harvester according to claim 5 in which said control valve means is solenoid-actuated, and said control means further including a source of current, electric switch means, means connecting said sensing means to said switch means, and an electric circuit connecting said switch means to said source of current.

7. The harvester according to claim 4 in which said sensing means responsive to the contour of a field comprises lever-like means supported by said header adjacent said cutterbar and spaced suitable distances transversely along said header, and further including linkage means extending between said lever-like means and said control means.

8. The harvester according to claim 7 in which said power means comprises fluid-operating cylinder and piston means and said control means comprises solenoid-operated valve means and electric switch means in an electric circuit connected to a source of current, and further including means connecting said sensing means to said electric switch means.

9. The harvester according to claim 8 in which said header includes a plurality of ground shoes slidably engageable with the surface of a field and responsive to the contour thereof, and said lever-like sensing means being engageable with said shoes and responsive to flexing thereof in response to said field contour and thereby vary the position of said reel relative to said cutterbar as aforesaid.

10. The harvester according to claim 4 further including means on said header movably connected to the forward end of said harvester to support said header for movement to selected elevated positions above a field contour surface, additional power means connected between said header and harvester and operable to effect said elevational movement, and means connecting said additional power means to said control means to effect movement of said header away from the surface of a field in response to movement of said reel relative to said cutterbar as controlled by the action of said sensing means upon said reel.

11. The harvester according to claim 10 in which power means for said reel and header respectively comprise fluid-operated cylinder and piston units and said control means therefor respectively comprise solenoid-operated valves, and said control means further including a plurality of electric switch means connected by an electric circuit to a source of current, said sensing means comprising means movably supported by the lower portion of said header and responsive to the contour of a field, and means connecting said latter means to said switch means for actuation thereof to energize said power means.

12. The harvester according to claim 11 further including common operating means for said switch means and in which said switch means which activates the control valve for said reel is closed prior to the switch means which activates the control valve for the header, and said switch means further including override mechanism connected to said switch operating means to permit further movement of said latter means to effect operation of the power means for said header while elevation of said reel continues.

13. The harvester according to claim 12 further including a cut-out switch in the circuit for said control valve for said reel operable to open said circuit to said control valve and discontinue elevating movement of said reel relative to said cutterbar incident to elevating movement of said header by said power means therefor.

14. The harvester according to claim 12 further including linkage means connected between said sensing means and said common operating means for said switch means.

* * * * *